United States Patent [19]

Sun

[11] Patent Number: 4,931,329

[45] Date of Patent: Jun. 5, 1990

[54] ENCLOSURE FORMING ADAPTORS AND RELATED APPARATUS

[76] Inventor: Robert J. Sun, 1409 Ferry St., Easton, Pa. 19042

[21] Appl. No.: 838,702

[22] Filed: Mar. 12, 1986

Related U.S. Application Data

[62] Division of Ser. No. 536,663, Sep. 28, 1983, abandoned.

[51] Int. Cl.⁵ .......................... B65D 8/22; B65D 8/16
[52] U.S. Cl. ........................... 428/36.92; 220/4 A; 220/306; 220/DIG. 14; 215/317; 47/69
[58] Field of Search ............... 220/4 A–4 C, 220/4 E, 4 R, 306, 307, DIG. 14, 212, 352, 355, 356; 215/317, 1 C, 211, 224, 228; 47/69; 428/35, 36.92

[56] References Cited

U.S. PATENT DOCUMENTS

| 2,543,427 | 2/1951  | Warne   | 220/212   |
|-----------|---------|---------|-----------|
| 2,950,567 | 8/1960  | Newman  | 47/69     |
| 2,990,998 | 7/1961  | Barclay | 220/356   |
| 3,263,847 | 8/1966  | Amann   | 215/1 C   |
| 3,360,153 | 12/1967 | Wheaton | 220/4 B   |
| 3,385,461 | 5/1968  | Mallin  | 215/1 C   |
| 3,799,821 | 3/1974  | Jones   | 220/DIG. 4|
| 4,377,231 | 3/1983  | Murphy  | 220/4 C   |

FOREIGN PATENT DOCUMENTS

| 1436030 | 3/1966  | France         | 215/1 C |
| 2005842 | 12/1969 | France         | 215/1 C |
| 534594  | 10/1955 | Italy          | 215/1 C |
| 1175048 | 12/1969 | United Kingdom | 215/1 C |
| 2132978 | 7/1984  | United Kingdom | 215/1 C |

OTHER PUBLICATIONS

Weaver, Neal, "Economy=Ecology", Oct. 1976.

Primary Examiner—Nancy A. B. Swisher
Attorney, Agent, or Firm—Woodcock, Washburn, Kurtz, Mackiewicz & Norris

[57] ABSTRACT

The invention includes a variety of adaptors for forming enclosures and other apparatus from sectioned integral containers. Each adaptor described includes suitable means such as a channel structure for attaching the adaptor to the sectioned open end of an integral container. The adaptor itself may form an enclosure with the container, or, in other embodiments, join the attached, sectioned container portion with another container sectio or other form of closure. The described adaptors are particularly designed for use with cylindrical plastic beverage container assemblies including an integral, dome bottom, cylindrically shaped container and container base piece adapted to receive and support the dome end of the container. A number of plant irrigation devices are described formed by sectioned portions of conventional integral containers and special adaptors of the invention.

6 Claims, 6 Drawing Sheets

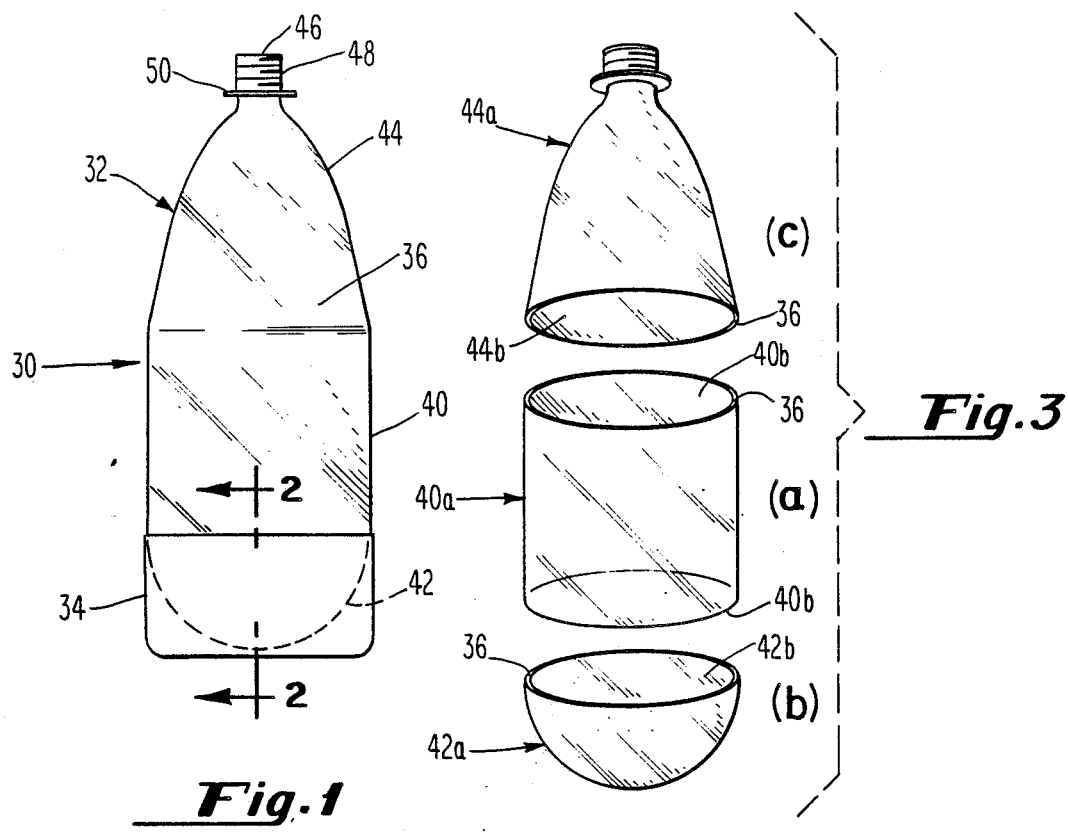
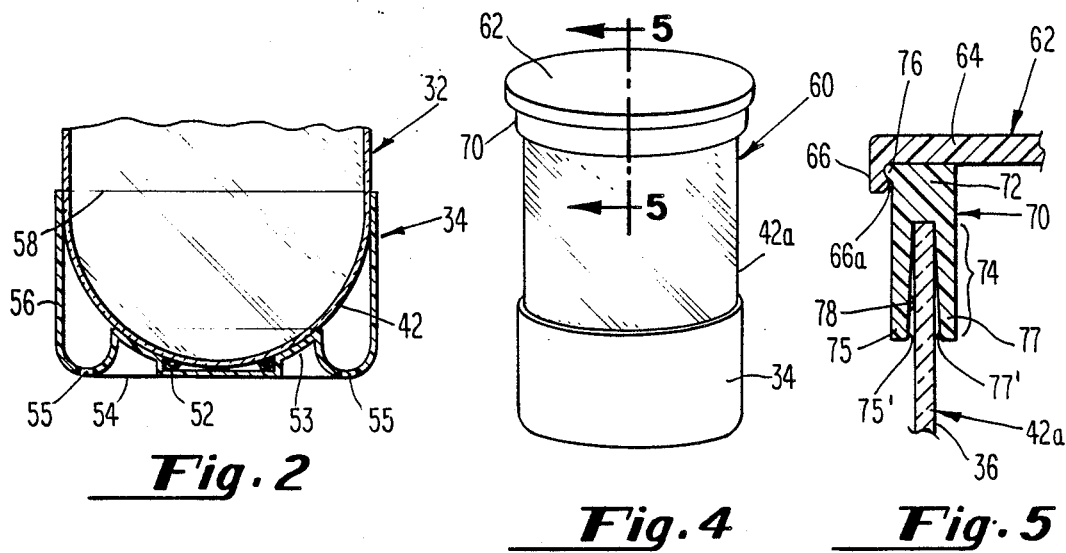

ENCLOSURE FORMING ADAPTORS AND RELATED APPARATUS

This is a division of application Ser. No. 536,663, filed Sept. 28, 1983 now abandoned.

FIELD OF THE INVENTION

The invention relates to novel enclosures which may be used for terrariums, gardening aids, toys and other uses and in particular to novel enclosures formed from sectioned portions of conventional plastic container assemblies.

BACKGROUND OF THE INVENTION

FIG. 1 depicts a conventional plastic, cylindrically-shaped two-piece container assembly achieving widespread use in the United States and elsewhere for the packaging of soft drinks, juices, mineral water and other beverages. The container assembly includes a dome bottom, cylindrically-shaped integral container 32 and a separate cup-like open topped base piece 34, shown in greater detail in FIG. 2, which is adapted for receiving the dome bottom portion of the integral container supporting the integral container in an upright fashion. The container assembly also typically includes a threaded cap (not depicted) for sealing the mouth of the integral container. The container assemblies are not reused by the drink bottlers and after use become part of a growing solid waste disposal problem.

It would be desirable to provide other uses for these and similar disposable containers to increase their utility and value, particularly a use which adds rather than detracts from environmental quality.

SUMMARY OF THE INVENTION

Applicant has discovered a number of novel enclosures and other apparatus which may be formed from sectioned portions of conventional disposable plastic containers or container assemblies, particularly two-piece plastic beverage containers, by the use of adaptors.

Adaptors of the present invention are preferably integrally formed and include a central body portion and suitable means such as a channel structure integrally formed with the central body portion for joining the adaptor to the side wall of a sectioned open end of an integral container. Most adaptors are further provided with a lip structure or other suitable means integrally formed with the central body portion for engaging the adaptor with attached sectioned integral container and a closure such as a cover, a second sectioned integral container or a container assembly base piece. It is not always necessary that the adaptor secure together the components forming the enclosure. In some cases it is desirable to be able to easily separate the enclosure components so as not to upset the contents of the enclosure. However, it is desirable to attach the adaptor to at least one container assembly portion for ease of use of the subsequently formed enclosure. Adaptors hereinafter described are provided with a channel structure to receive and frictionally secure the adaptor to the sectioned open end of a container portion so that the adaptor may be removed and subsequently reused.

The adaptors hereinafter described are generally circular for use with cylindrical drink containers but other shapes may be used. In some instances the body portion of the adaptor will be solid so as to form a closure when used with a single sectioned container piece or a partition wall when joining closure elements. In other instances an annular ring is formed. The adaptor may be formed as a linear extrusion from a pliable plastic or other material with flexibility sufficient to allow it to be bent into a suitable shape for use. One adaptor preferred for forming a resealable container includes a radially protruding lip adapted for engaging a conventionally formed container cover having a transversely extending outer circumference rim.

Another adaptor preferred for making a terrarium or seed starting enclosure includes a plurality of bores extending through the body portion to allow air to circulate in the container. The container is transparent to admit more light.

Yet another adaptor comprises a pair of interlocking collars. Each collar has a channel structure of the type previously described or other suitable means for securing the collar to the cross-sectioned open end of an integral container. Threads or other suitable means are provided in or on the collars for interlocking the collars together in a conventional fashion.

Another aspect of the invention is a number of unusual enclosures formed from conventional two-piece drink container assemblies and other plastic containers. One novel enclosure is formed by transversely sectioning the integral container of a conventional two-piece beverage container assembly, preferably along its cylindrical portion, and fitting the sectioned base portion of the assembly with a frictionally secured adaptor having a radially protruding lip which cooperates with a cover piece to form a resealable container.

Another novel enclosure is formed from a conventional two-piece beverage container assembly and includes a sectioned portion of the integral container and base piece of the assembly and an adaptor joining the open end of the sectioned integral container and the open top of the base piece. The dome bottom portion of the integral container is used and forms a transparent dome covering over the base piece. Other enclosure variations hereinafter described include one formed from a pair of integral dome bottom containers. A sectioned portion of each integral container is fitted with one of two ring adaptors which interlock together securing the two container sections together.

Yet another aspect of the invention is a variety of enclosure-like gardening aids which are designed to be used with the threaded neck portion of a conventional plastic drink container for plant irrigation or the like. Each includes a fluid containing body, a filler opening through a wall of the containing body adapted to receive the threaded mouth portion of a conventional plastic drink container of the type previously described and a plurality of channels through one or more opposing walls of the containing body for dispensing liquids from the body. The body is preferably of a suitable design to allow it to be buried without being crushed. Several such devices are described.

The invention also covers the method of forming an enclosure comprising the steps of transversely sectioning an integral container to form a container portion having an open end where sectioned and covering the open end to form the enclosure. In particular, the method further includes securing an adaptor to the sectioned open end of the container portion and joining the adaptor with a closure which may be another sectioned drink container portion or a container base piece or conventional resealable cover.

The invention also includes new designs for plastic container assemblies whereby portions of the assemblies may be interfitted to form unusual enclosures without the necessity of an adaptor. One embodiment of this aspect of the invention is an improvement to a plastic drink container assembly comprising an integral container having a substantially cylindrically center portion, a domed base portion integrally formed with the center portion, a crown portion integrally formed with the center portion and necking into a mouth opening, and a separate base piece having a circumferential side wall forming an open top for receiving said dome base and supporting said container. The improvement comprises providing a circumferential lip in the integral container protruding outwardly at a location between the center portion and crown portion and having a minimum outer diameter greater than the maximum diameter of the open top of the container base piece. Preferably too, the crown portion of the integral container has an outer diameter near this lip, which is less than the inner diameter of the base piece, whereby the inner surface of the side wall of the base piece frictionally engages the crown portion of the container when the container is sectioned in the crown portion and inserted invertedly into the base piece open top with said circumferential lip resting upon the open top of the base piece.

Yet another embodiment of this aspect of the invention is an integral container and separate base piece of the type previously described wherein the circumferential side wall of the separate base piece is formed with an annular interior ridge adapted for receiving and supporting a cross-sectioned open end of the cylindrical portion of the integral container.

These and other aspects of the invention will be better understood by reference to the accompanying drawings.

BRIEF DESCRIPTION OF THE DRAWINGS

FIG. 1 depicts a conventional, prior art, two-piece plastic drink or beverage container assembly from which enclosures of the present invention are constructed;

FIG. 2 is an enlarged transversely sectioned view of the lower portion of the container assembly of FIG. 1 depicting the base piece receiving and supporting in an upright position the integral container;

FIG. 3 shows in parts (a) (b) and (c) three cross-sectioned portions of the integral container of FIG. 1 which are used in various embodiments of the subject invention;

FIG. 4 is a first enclosure embodiment formed by the base piece, with a cross-sectioned dome end container portion, an adaptor of the present invention and a cover.

FIG. 5 is a side-sectioned view of a portion of the enclosure of FIG. 4 along the line 5—5;

DETAILED DESCRIPTION OF THE INVENTION

Figure 6:
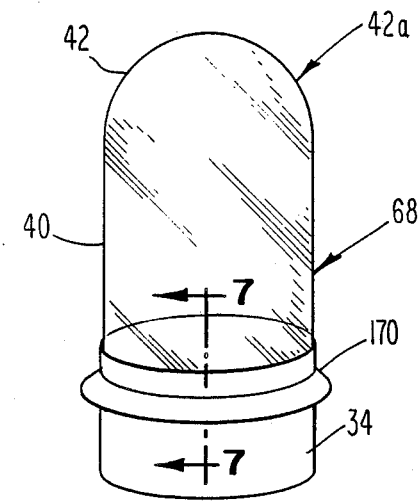
FIG. 6 is a second enclosure embodiment suitable for use as a terrarium or plant starter.

FIG. 1 depicts a conventional two-piece plastic container assembly 30 widely used for the sale of soft drinks, mineral water and other drink and/or beverage products. The assembly 30 includes a transparent plastic integral container 32 and a separate plastic base piece 34. The integral container 32 typically includes a symmetric side wall 36 forming a cylindrical center section 40, a dome base section 42 (depicted in phantom) at the bottom end, and a crown section 44 at the opposing end necking to an open mouth 46. The extreme end of the crown portion 44 near the mouth 46 is typically provided with threads 48 on the exterior surface for accepting a threaded sealing cap (not depicted). A ridge or lip 50 is also typically integrally formed near the mouth 46 to aid in grasping and maneuvering the container. The base piece 34 and dome bottom portion 42 of the container 32 are shown in greater detail in FIG. 2. The base piece 34 includes a base portion 54, a circumferential side wall 56 integrally formed with the base portion 54 and forming an open top 58, typically circular, accepting the dome end 42 of the integral container 32. The base piece 34 is typically provided with an integrally molded circular support ring 53 adapted to conform to the dome portion 42 of the integral container 32 and assists in supporting the container 32 in the upright position. Plastic adhesive beads 52 are provided to join the dome bottom 42 of the container 32 to the base piece. Holes 55 are also typically provided through the base portion 52 for drainage. Although the central section 40 of the container 32 and side wall 56 of the base piece 32 are sometimes hereinafter referred to as "cylindrical", it will be appreciated that containers 32 and base pieces 34 may flare somewhat, be somewhat necked or both in their central portion and side wall, respectively, and "cylindrical" as used herein means substantially cylindrical or substantially circular at each transverse cross-section along the length of the cylindrical portion 40 or side wall 56.

Novel enclosures of the present invention utilize one or more 40a, 42a, and 44a of the integral container 32, which are depicted in FIG. 3, parts (a), (b) and (c), respectively, formed by cross-sectioning the integral container 32 in or near the cylindrical section 40 of the container. The cylinder portion 40a is formed by sectioning the container 32 at or near either end of the cylinder section 40. In the enclosures hereinafter described, the neck and bottom portions (44a and 42a respectively) used typically include some or all of the cylindrical portion 40 of the container 32. Each portion 40a, 42a and 44a has at least one sectioned open end 40b, 42b or 44b formed by the side wall 36 of the container 32 at the sectioning point. The base piece 34, and cross-sectioned container portions 40a, 42a, and 44a, shall hereinafter be referred to generically as enclosure assembly pieces.

First adaptor and enclosure embodiments are depicted in FIGS. 4 and 5. The enclosure 60 is formed by a container base piece 34 with attached, dome bottomed section 42a of a conventional, integral beverage container including a significant portion of the cylindrical section 40 of the container, annular adaptor 70 and closure cover 62. The adaptor 70 includes a central body portion 72, a channel section 74 at one end for attaching the adaptor 70 to the open end of the integral container section 42a and a radially protruding lip 76 at the opposing end of the adaptor 70 adapted to engage the circumferential outer rim 66 extending transversely from the central planar portion 64 of the enclosure cover 62. The channel section 74 is formed by a pair of substantially parallel legs 75 and 77. Dimples 78 (one of which is shown in FIG. 5) are alternately spaced on opposing inner walls 75' and 77' of the legs 75 and 77 respectively, so as to frictionally engage the side wall 36 of the container section 42a. The cover 62 is conventionally formed and may include along the inner circumferential surface of the outer rim 66 near the extreme tip of the rim a slight ridge 66a so as to better engage and secure the cover 62 to the adaptor 70.

Figures 7, 8:
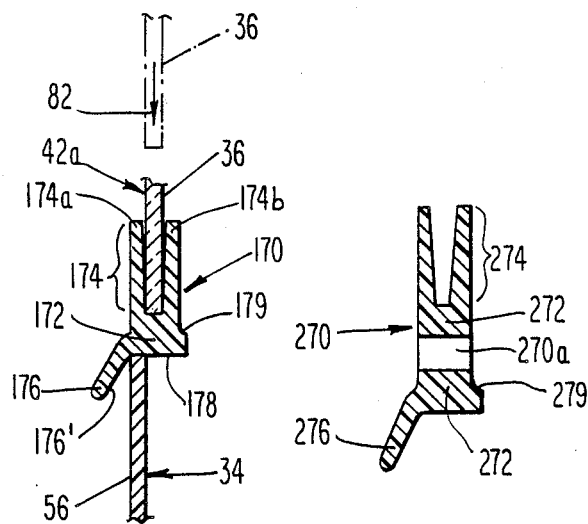
FIG. 7 is a side-sectioned view of a portion of the FIG. 6 enclosure along lines 7—7.
FIG. 8 is a side-sectioned view of a modification of the adaptor of FIGS. 7 and 8 wherein vent holes are provided.

FIG. 6 depicts a second envisioned enclosure 68 formed by a base piece 34, a dome ended container portion 42a including integral dome bottom 42 and cylindrical sections 40 and adaptor 170 of the present invention which can be used as a seed starter or terrarium. The adaptor 170 is depicted in greater detail in a side sectioned view in FIG. 8 and is shown interfitted with the base piece 34 and cross-sectioned container portion 42a. The adaptor 170 also includes a base or central body portion 172. Projecting from one side of the base 172 is a channel structure 174 formed by a pair of spaced legs 174a and 174b diverging slightly as they extend from the central body 172 which receives the side wall 36 at the sectioned open end of the container portion 42a and secures the adaptor to that portion 42a. Projecting from an opposing side of the base 172 is a lip structure 176 which is adapted to slip over the open top 57 of the container base piece 34. The projection of the lip 176 is exaggerated in FIGS. 6–8 for emphasis. The adaptor 170 and container portion 42a are supported by the top of the side wall 56 (see also FIG. 2) which contacts a lower surface 178 of the central body 172 of the adaptor 170. The circumferential lip 176 as shown is provided with an inner frustoconical surface 176' so as to accept base pieces 34 within diametric tolerance variations. A constant inner diameter lip can be provided. A spur or ridge 179 also may be provided protruding from the central body portion 172 on what will be the inner circumferential side of the adaptor 170 when attached to the container portion 42a. This can be used to support a partition (not depicted). The opposing inner walls of the channel structure legs 174a and 174b may be inwardly tapered or inwardly curved or provided with protrusions like 78 of adaptor 70 or both so as to compress against and provide a secure frictional fit with respect to the side wall 36 of the sectioned container portion 42a. Assembly of the enclosure 68 is also indicated in FIG. 7. The side wall 36 is first inserted into the channel structure 174 as is indicated by the arrow 82 and wall section 36 in phantom. The adaptor 170 with portion 42a is then fitted over side wall 56 forming the open top of the base piece 34.

The lip structure 176 acts to center the container portion 42a and adaptor central body 172 with respect to the open top 58 of the container base piece 34. A secure frictional fit between the lip 176 and base piece 34 is not particularly desirable for a terrarium or seed starter as easy removal of the dome 42a and adaptor 170 is desired for access without disturbing the contents of the enclosure. However, it is envisioned that a frictional fit would be desirable for certain uses of the depicted novel container 68 and that the lip 176 can be suitably tapered or formed to provide such a relationship. Apertures or bores 55 typically provided in the base piece 34 will act as drainage holes. The base piece 34 is partially filled with a suitable planting medium and planted with seeds or seedlings. For sprouting, a damp sponge, blotter paper or the like may be used. If desired, a modified adaptor embodiment 270 depicted in cross-sectional form in FIG. 8 may be provided. The adaptor 270 differs from the adaptor 170 in that the former is provided with an elongated body 272 between channel 274 and lip 276 structures and a number of bores 270a acting as vent openings extending through the central body 272 between the upper channel 274 and lower lip 276. The adaptor 270 is preferably transparent or at least translucent to allow more light to enter the enclosure.

Figure 9:
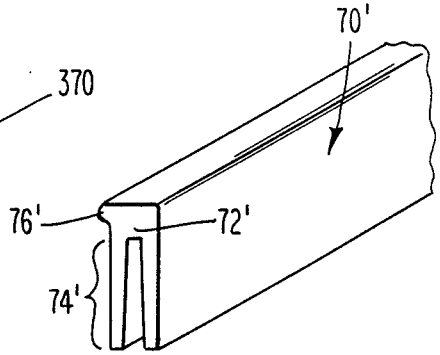
FIG. 9 depicts a flexible linear extrusion embodiment of the adaptors of FIGS. 4-7.

It is envisioned that the adaptors 70, 170, 270 and other adaptor embodiments subsequently described will be integrally formed from a suitable plastic material by molding or extrusion. The adaptors 70, 170 and 270 described thus far are envisioned to be formed in an annular shape by molding or the like during fabrication. A planar adaptor embodiment 70' of the adaptor 70 is depicted in FIG. 9 and includes a planar body portion 72', lower channel structure 74' and an upper flange structure 76' which becomes a protruding lip when the embodiment 70' is bent into an annular form. The adaptor embodiment 70' is envisioned to be formed by extruding a plastic material which is sufficiently flexible to allow it to be bent to form a ring shaped adaptor.

Figure 10:
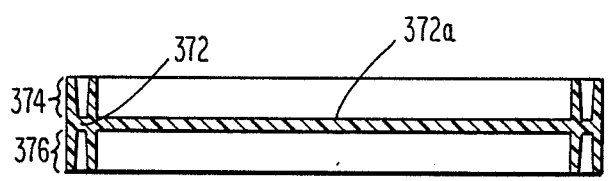
FIG. 10 is yet another annular adaptor embodiment having a solid center.
Figure 12:
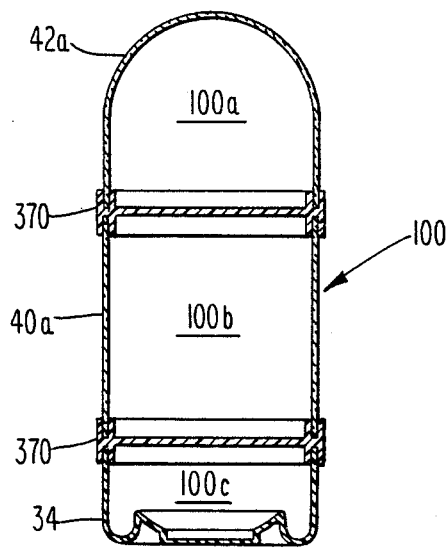
FIG. 12 is a second, multi-chambered enclosure formed from a plurality of the adaptors of FIG. 10.
Figure 11:
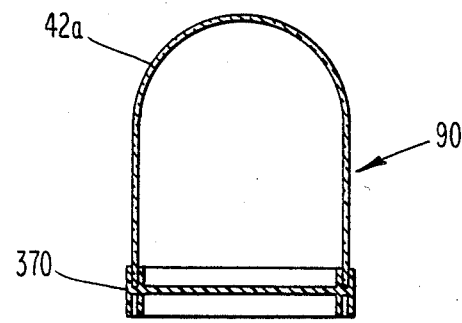
FIG. 11 is one enclosure embodiment formed with the adaptor of FIG. 10.

FIG. 10 depicts in a cross-sectional view yet another adaptor embodiment 370 including a solid circular base section 372, upper channel structure 374 and an opposing lower channel structure 376. The lower channel structure 376 operates in the same way as the upper structure 374. It is believed the diametric variations between the base piece top 58 and sectioned container ends 40b, 42b, and 44b will allow the design of an adaptor 70, 70', 170, 270 or 370 which may be used with either. The circular base 372 of the adaptor embodiment 370 has a solid center section 372a. FIG. 11 depicts a novel enclosure 90 formed from a single dome ended container portion 42a and the adaptor 370. FIG. 12 depicts a multi-section enclosure 100 formed by a pair of the solid adaptors 370, a dome ended container portion 42a, a cylindrical portion 40a and a base piece 34. The solid circular base 372a of each adaptor 370 partitions the enclosure 100 into three separate sections 100a, 100b, and 100c.

Figure 13:
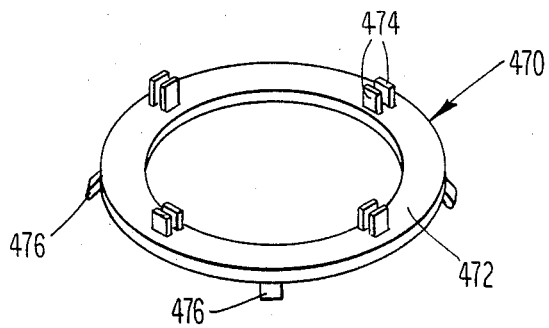
FIG. 13 is yet another adaptor embodiment.

It will be appreciated that there may be substituted for those integral adaptor structures described thus far a plurality of spaced, individual structure elements such as are shown in FIG. 13 depicting yet another adaptor 470. The adaptor 470 again has a continuous annular base or central body 472 and is provided with a plurality of individual channel structures 474 extending outwardly from a first side of the base 472 and a plurality of individual, spaced lip structures 476 projecting from an opposing side of the base 472. It will be appreciated that for certain applications it may be desirable to provide only lip structure 476 or only channel structure 474 on both sides of a central body 472.

Figure 14:
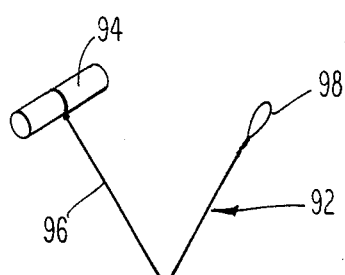
FIG. 14 is a wire tool for severing the adhesive bond typically provided between the integral container and base piece of a two-piece drink container assembly.
Figure 15:
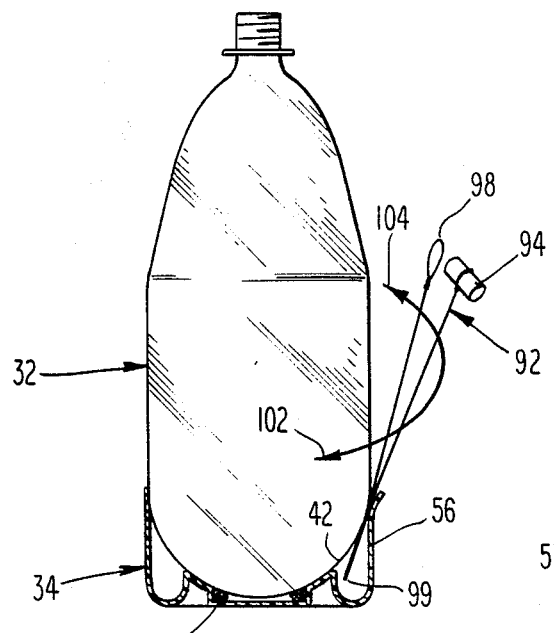
FIG. 15 shows the base of the V-shaped tool being inserted between the dome bottom of the container and the side wall of the base piece.

FIG. 14 depicts a tool 92 which may be used to separate the integral beverage container from the container 32 and base piece 34, which pieces are typically glued together as previously described. The tool 92 consists of a handle 94 attached to one end of a stiff but ductile wire 96. The remaining end of the wire is provided with a loop 98 sufficiently large so that it may be slipped over an end of the handle 94. For use, the wire 96 is bent approximately in its middle so as to form a V-shape as depicted. The base 99 of the V is inserted as depicted in FIG. 15 between the side wall 56 of the base piece 34 and dome bottom portion 42 of the integral container 32. When well inserted, the handle 94 and loop 98 are pulled around the opposite sides of the integral container 32 as indicated by arrows 102 and 104 and the loop end 98 slipped over an end of the handle 94. The handle 94 is then pulled as indicated by arrow 106 in FIG. 18 drawing the wire 96 across the dome bottom 42 of the container 32 thereby cutting the glue beads 52. Heating the bonded area with hot water will make this procedure easier. Alternatively, the base 34 and bottom of the integral container 32 can be immersed so as to cover the glue beads 52 in water sufficiently hot and for a time sufficiently long as to soften the glue enough to allow the base 34 and container 32 to be separated by hand. Immersion for a few minutes in water at a temperature of about 140° F. should suffice.

Figure 17:
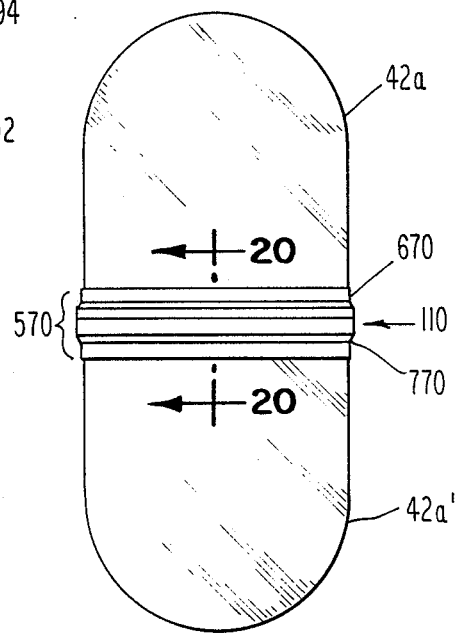
FIG. 17 depicts yet another enclosure embodiment using an annular adaptor formed by a pair of interfitting collars.
Figure 16:
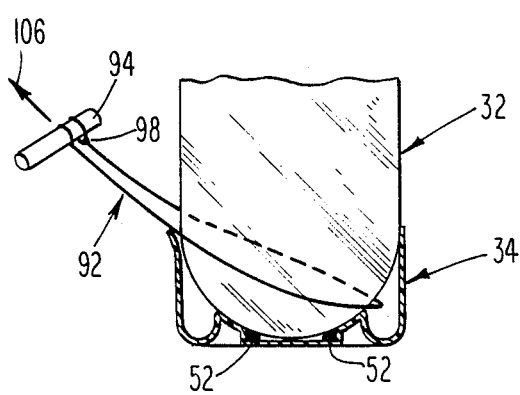
FIG. 16 depicts the severing of the adhesive bond by the wire tool.
Figure 18:
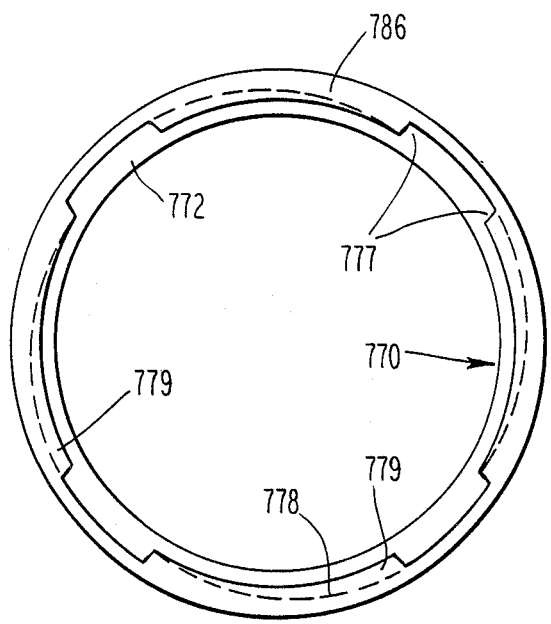
FIG. 18 is a plan view of one of the pair of collars of FIG. 17 showing its interlock structure.
Figure 20:
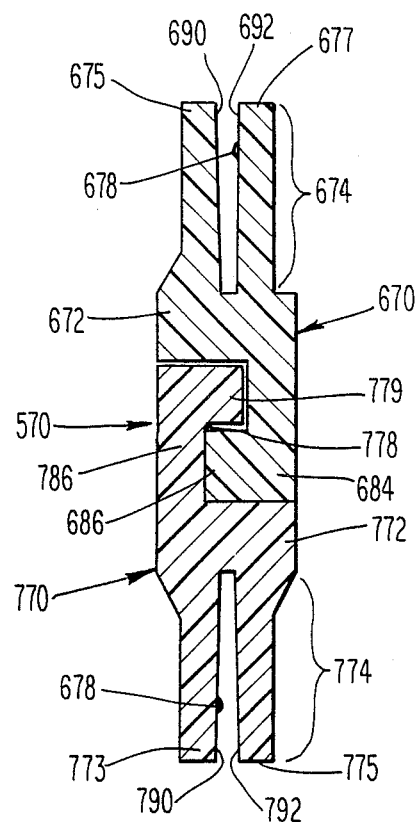
FIG. 20 is a cross-section view of the joined pair of collars of FIGS. 17–19.
Figure 19:
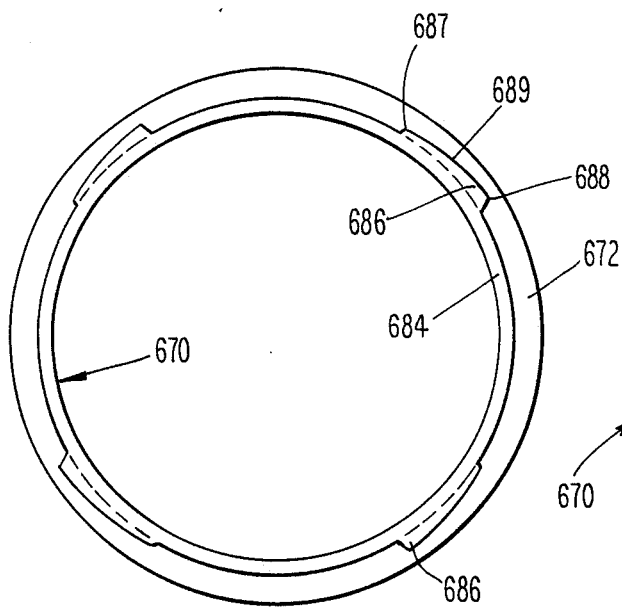
FIG. 19 is a plan view of the remaining collar of the pair of FIG. 17 showing its complementary interlock structure.

FIG. 17 depicts yet another envisioned enclosure 110 and two-piece adaptor 570 according to the invention. The enclosure 110 is formed by a pair of dome bottom container portions 42a and 42a' and a pair of bayonet-type interlocking adaptor rings 670 and 770 with male-female interlocking structure. Each adaptor ring 670 and 770 is provided on one side with a channel structure 674 and 774, respectively to receive a sectioned open end of a container portion 42a or 42a'. The channel structure 674 is best seen in FIG. 20 depicting the interlocked rings 570a and 570b in sidesectioned view. An interlocking side of the upper adaptor ring 670 is depicted in FIG. 18. A complementary interlocking side of the lower ring 770 is shown in FIG. 19. Rising above a central body portion 672 of the adaptor 670 in FIG. 18 is a "male" structure 684 integrally formed with the central body portion 672 and projecting transversely to the annular plane. Four lugs 686 are uniformly spaced projecting radially outward from the male structure 684. The radial dimension of each lug 686 increases from one side 687 to an opposing side 688. The extreme radial surface 689 of each lug 686 frictionally engages the lower adaptor ring 770.

Figure 21:
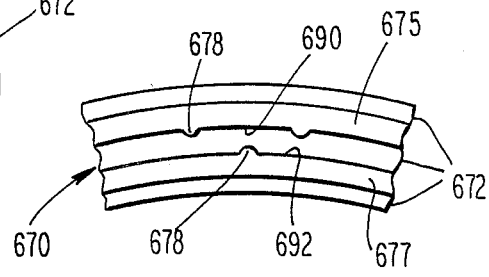
FIG. 21 is a fragmentary plan view of the opposing side of the collar depicted in FIG. 18 showing the wall protrusions spaced in the channel structure of the collar for gripping.

The lower ring 770 also includes the central body portion 772, an annular channel structure 774 (seen in FIG. 20) projecting from one side of the central body 772 and an interlocking "female" or lip structure 786 (seen from above FIG. 19) for interlocking with the "male" structure 686 of ring 670. The lip structure 786 also protrudes from the plane of the annular body portion 772 of the ring 770 and is characterized by gaps 777 uniformly spaced around the inner circumference of the lip structure 786. The lip structure 786 is formed with an undercut of varying depth (indicated in phantom) between adjoining gaps 777 leaving lips 779 of varying widths. As can be seen in FIG. 21 the extreme radial surface 689 of each lug 686 engages the undercut wall 778 (indicated by the phantom lines in FIG. 19) of the lip structure 776. Again as shown in FIG. 21, dimples 678 are alternately provided on the opposing inner surfaces 690 and 692 of legs 675 and 677 of the upper ring 670 for frictional engagement with the side wall of the sectioned container piece 42a. Similar dimples are spaced about the opposing inner walls 790 and 792 of legs 773 and 775 of the lower ring 770. Alternatively, clips embedded in the opposing inner walls 690 and 692, 790 and 792 or glue may be used to join each ring 670 and 770 to a container section. Moreover, other interlocking structures such as complementary threads may be provided on the pair of rings 670 and 770 in place of the bayonet structure described. The primary envisioned use of the container 110 is as a child's lunch container but other uses are feasible.

Figure 22:
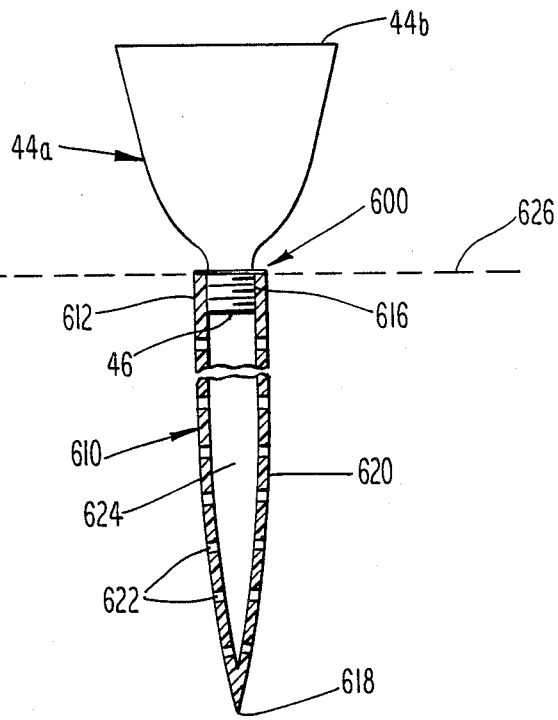
FIG. 22 is a cross-section view of a first embodiment plant irrigation adaptor of the present invention with integral container portion.
Figure 23:
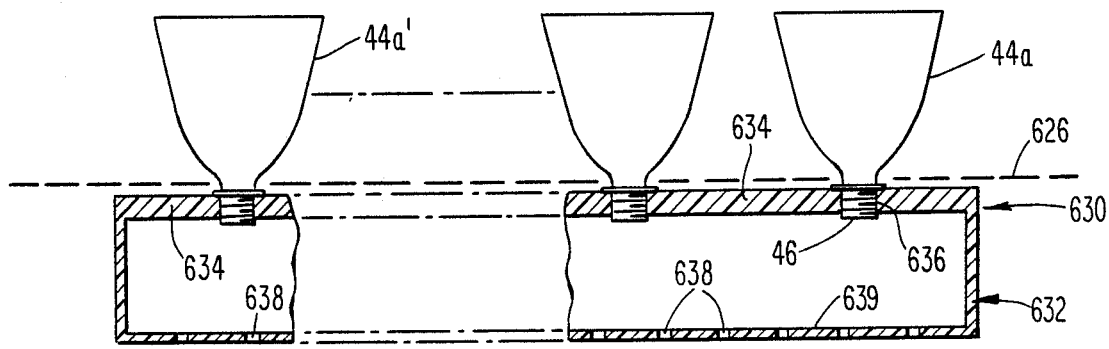
FIG. 23 is a cross-section view of a second embodiment plant irrigation adaptor with integral container portions.
Figure 24:
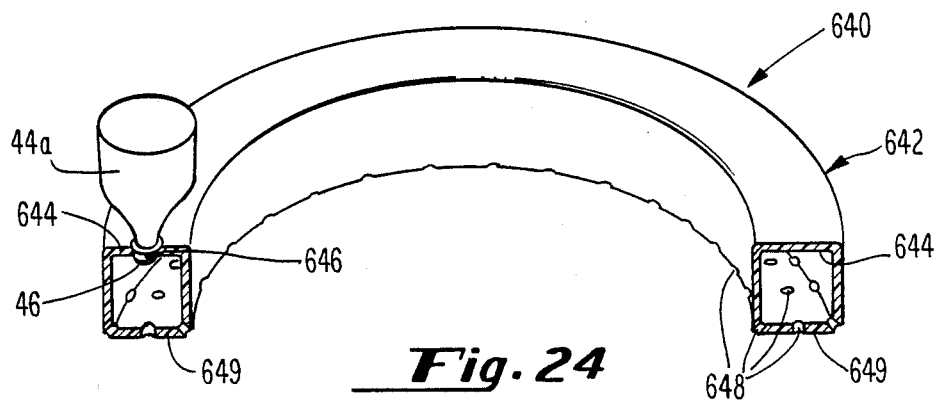
FIG. 24 is a cross-sectional perspective view of a third embodiment plant irrigation adaptor with integral container portion.

FIGS. 22, 23 and 24 show various embodiments of envisioned plant irrigation devices which may be used as gardening aids and which utilize the crown section 44a with or without integral cylindrical section 40 of a conventional integral plastic drink container 32. FIG. 22 depicts a deep irrigating device 600 formed by an adaptor 610 and sectioned crown portion 42a of an integral beverage container. The adaptor 610 is a fluid containing body with head portion 612 at one end provided with a threaded inner side wall 616 for accepting the threaded mouth 46 of a sectioned integral container 44a, an earth penetrating tip 618 at the opposing end and a central elongated shaft portion 620. The shaft portion 620 is provided with a number of channels 622 connected with the mouth 46 by means of a larger central channel 624. The adaptor 610 and interconnected crown container portion 44a are buried to a desired depth beneath the surface of the earth (indicated by dotted line 626) or pushed into the earth using the tip 618. If desired, a crown section 44a with integral cylindrical portion 40 may be used for greater depth and/or fluid capacity. Water and/or liquid fertilizer is poured into the sectioned open end 44b of the container portion 44a for subsurface release by the device 610.

In FIG. 23 an elongated plant irrigation device 630 is shown with a major portion of its center removed to reduce the figure size and includes an elongated fluid containing body 632 with hollow interior 633. The device 630 has an upper elongated wall 634 which includes one or more filler openings 636 though an upper elongated wall 634, like the head 612 of FIG. 22, are threaded to receive the threaded mouth 46 of crown container portion 44a. A plurality of holes or channels 638 is provided through the lower elongated wall 639 of the containing body 630 opposite the upper wall 634 to release fluids from the device 630 into the soil.

In FIG. 24 a third plant irrigation device 640 is formed by a hollow, elongated fluid containing body 642 shaped into a ring. One or more filler openings 646 are again provided in the elongated upper wall 644 of the body 642 to receive the threaded mouth 46 of a crown section 44a. Again, a plurality of small openings or channels 648 are provided through the lower elongated wall 649 opposite the upper elongated wall 644 and filler opening(s) 646. It is further envisioned that the devices 630 and 640 may be made from a flexible plastic material so that they may be twisted and deformed somewhat to fit different contours.

Figure 25:
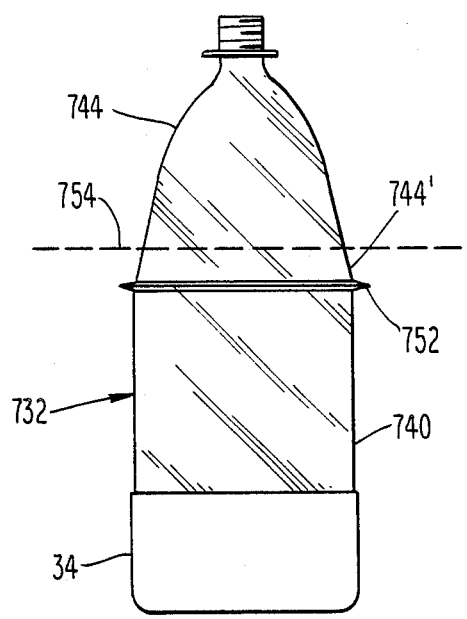
FIG. 25 depicts an improved integral plastic drink container with integrally formed lip.
Figure 26:
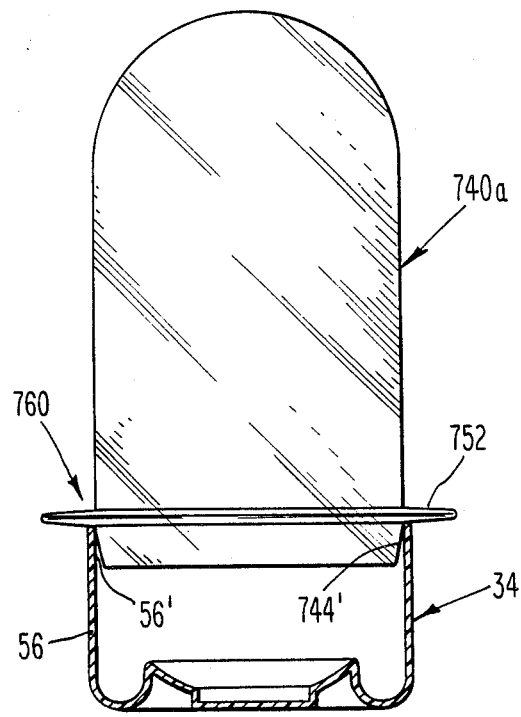
FIG. 26 depicts a novel enclosure formed by sectioning the container of FIG. 25.

FIG. 25 depicts a modified integral plastic beverage container 732 which may be used with a conventional base piece 34 so as to form a terrarium, plant starter or similar container 760 depicted in FIG. 26 without the need of an adaptor. The container 732 is similar in virtually all respects to the container 32 of FIG. 1 but is provided with an integrally formed, circumferential lip 752 protruding outwardly at the shoulder of the container 732 where the central cylindrical portion 740, having a substantially uniform diameter along its length, meets the crown section 744 having a diminishing cross-sectional diameter. The lip 752 has an outer diameter greater than the maximum outer diameter of the open top of the base piece 34. The cross-sectional diameter of the crown portion 744 within approximately one-half inch of the lip 752 should have a diameter only slightly smaller than the inner diameter of the open top of the base piece 34 supplied with the integral container 732. The container 732 may then be cut within approximately one-half inch of the lip 752 as indicated by the broken line 754 to form a container portion 740a which is inverted and inserted into the conventional base piece 34 as depicted at FIG. 26. The container portion 740a is supported by the lip 752 which rests upon the upper surface of the base side wall 56 forming the circular open top of the base piece 34. Preferably the crown portion 744 of the container 732 near the lip 752 is envisioned to have an outer diameter slightly less than the inner diameter of the side wall 56 of base piece 34 near the open top so that there is some frictional engagement between the outer surface 744' of the crown and inner circumferential surface 56' of side wall 56 when the lip 752 rests on the upper surface of the base piece side wall 56.

Figure 27:
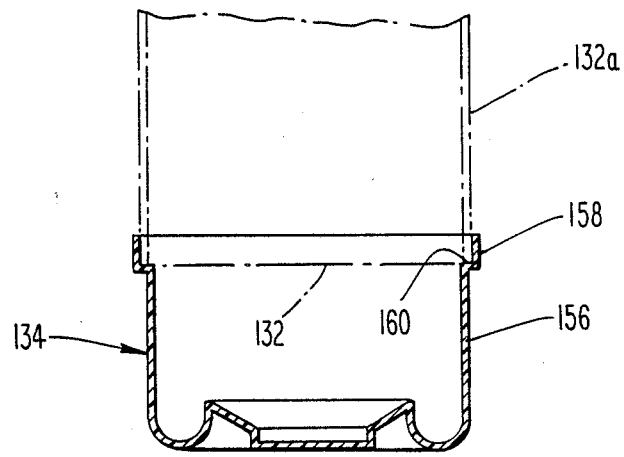
FIG. 27 is a sectioned view of an improved base piece embodiment including an interior ridge for forming a novel container with a sectioned portion of an accompanying conventional integral container.

FIG. 27 depicts a new, envisioned container base piece embodiment 134 having a circumferential side wall 156 incorporating a flared portion 158 forming an inner annular surface 160 for receiving and supporting the open end 132 of a cross-sectioned portion 132a of an accompanying, integral plastic drink container (depicted in phantom).

Although various embodiments of the several aspects of the invention have been described and certain modifications and changes thereto suggested, the scope of the invention is not limited to the described embodiments but is rather set forth in the accompanying claims.

What is claimed is:

1. An enclosure formed from a pair of integral plastic containers comprising:
a first cross-sectioned portion of one of said integral containers having a sectioned open end, a side wall and an opposing closed end;
a first adaptor means fixedly secured to said open end, said first adaptor means having a central body portion, a channel structure integrally formed with said central body portion and projecting from one side thereof, said channel structure having a pair of opposing legs, and a lip structure protruding outwardly from the plane of said first central body portion;
a second cross-sectioned portion of the remaining integral container having a sectioned open end, a side wall and an opposing closed end;
a second adaptor means fixedly secured to the open end of the second cross-sectioned portion, said second adaptor means having a central body portion, and a channel structure integrally formed with said central body portion and projecting from one side thereof, said channel portion having a pair of opposing legs and a lip structure protruding outwardly from the plane of said central body portion of said second adaptor means, said protruding lip structure of said first adaptor means and said protruding lip structure of said second adaptor means interlocking with each other to fixedly secure the first and second adaptor means together.

2. The enclosure of claim 1 wherein each of said legs of said first adaptor means has an inner surface, at least one of said inner surfaces having at least one protrusion for frictionally engaging said side wall at the open end of said first sectioned portion of the container.

3. The enclosure of claim 2 wherein each of said legs of said second adaptor means has an inner surface, at least one of said inner surfaces having at least one protrusion for frictionally engaging said side wall at the open end of said second sectioned portion of the container.

4. The enclosure of claim 8 wherein said first lip structure further comprises a lug member projecting radially outward from said first lip structure, said first lug member substantially parallel to the plane of the central body portion and said second lip structure further comprises a lug member projecting radially outward from said second lip structure, said second lug member substantially parallel to the plane of the central body portion, wherein said first lip structure lug member and said second lip structure lug member interlock with each other to fixedly secure the first and second adaptor means together.

5. The enclosure of claim 4 wherein said lug member of said second lip structure frictionally engages said first lip structure.

6. An enclosure formed from a pair of integral plastic containers comprising:
a first cross-sectioned portion of one of said integral containers having a sectioned open end, a side wall and an opposing closed end;
a first adaptor means fixedly secured to said open end, said adaptor means having a central body portion, a channel structure integrally formed with said central body portion and projecting from one side thereof, said channel portion having a pair of opposing legs, each of said legs having an inner surface with at least one protrusion for frictionally engaging said side wall at the open end of the first sectioned portion of the container and a first lip structure integrally formed with and protruding outwardly from the plane of the central body portion, said first lip structure including a lug member projecting radially outward from said first lip structure, said lug member substantially parallel to the plane of the central body portion;

a second cross-sectioned portion of the remaining integral container having a sectioned open end, a side wall and an opposing closed end;

a second adaptor means fixedly secured to the open end of the second cross-sectioned portion, said second adaptor means having a central body portion, and a channel structure integrally formed with said central body portion and projecting from one side thereof, said channel portion having a pair of opposing legs, each of said legs having an inner surface with at least one protrusion for frictionally engaging said side wall at the open end of the sectioned portion of the container and a second lip structure integrally formed with and protruding outwardly from the plane of the central body portion, said second lip structure including a lug member projecting radially outward from said first lip structure, said lug member substantially parallel to the plane of the central body portion, wherein said first lip structure lug member and said second lip structure lug member interlock with each other to fixedly secure the first and second adaptor means together.

* * * * *